Figure 1:
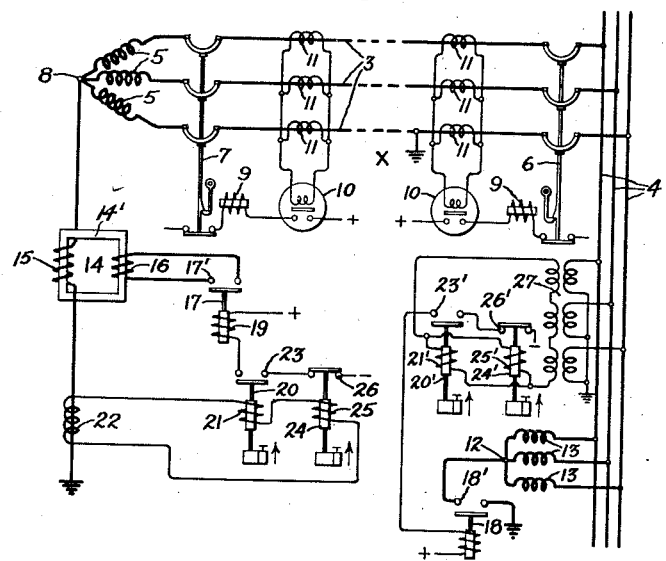

Oct. 7, 1941.    F. A. HAMILTON, JR    2,258,246
PROTECTION OF ALTERNATING CURRENT ELECTRIC SYSTEMS
Filed March 1, 1940

Inventor:
Francis A. Hamilton Jr.
by Harry E. Dunham
His Attorney.

Patented Oct. 7, 1941

2,258,246

UNITED STATES PATENT OFFICE 2,258,246

PROTECTION OF ALTERNATING CURRENT ELECTRIC SYSTEMS

Francis A. Hamilton, Jr., Schenectady, N. Y., assignor to General Electric Company, a corporation of New York Application March 1, 1940, Serial No. 322,518

8 Claims. (Cl. 175—294)

My invention relates to improvements in the protection of alternating current electric systems and more particularly to ground fault protection of alternating current electric systems of the type wherein a fault to ground on a phase conductor of the system substantially increases the capacitance current to ground of the ungrounded phase conductors of the system.

A large percentage of the faults on alternating current electric systems involves, initially at least, only a single conductor to ground. Most of these are of a transient or arcing character. It is, therefore, desirable, whenever possible, to clear such faults without circuit breaker operations. Such arcing ground faults may be cleared by arc suppressing or ground fault neutralizing apparatus of the type disclosed in United States Letters Patent 1,537,371, issued May 12, 1925. Such apparatus by itself is effective only on alternating current electric systems of the type wherein a fault to ground on a phase conductor of the system substantially increase the capacitance current to ground of the ungrounded phase conductors of the system.

In such systems it is impractical in case of faults which the ground fault neutralizer cannot suppress, to secure that selectivity of relay operation which will, in case of such faults, disconnect only the faulty portion of the system and yet maintain continuity of service on sound portions. This is in part due to insufficient fault current to insure the necessary discrimination within the sensitivity limits of the relays. Moreover, when selectivity is based on the use of ground fault directional relays, the variation in power factor at any point of the system, in dependence on the location of the fault even though the power factor may change in sign, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined, since there is usually plenty of fault current with a large power factor variant for different fault locations. Accordingly, if after a predetermined time sufficient for the ground fault neutralizer to clear a transient fault, the fault still exists, it is desirable to put the system grounding connections in condition to correspond with the prearranged selectivity of the ground fault relays so that they may have an opportunity to clear the fault.

If the ground fault relays operate correctly to clear the fault, the system should be returned to ground fault neutralizer operation with the minimum of delay so as to be ready for further faults. If the ground fault relays or the circuit breakers which they control fail to clear the fault, then, after a predetermined time of grounding, it is desirable to return to ground fault neutralizer operation since this will limit the flow of ground fault current so that system operation may continue until the fault is cleared by suitable manipulation of the system circuit breakers. In those cases where the fault is not cleared by the action of the ground fault neutralizers or the ground fault relays, it is important that for any one fault, grounding switches close and open only once. In other words, for any one fault, repetitions of these switching operations, sometimes referred to as pumping, should not occur.

One object of my invention is to provide an improved protective arrangement whereby, in case the ground fault neutralizing means fails to clear a fault within a predetermined time, there is effected a grounding of the system which corresponds to prearranged settings of the ground fault relays. A second object of my invention is to provide an improved protective arrangement whereby the system is restored to ground fault neutralizing operation as soon as a fault is cleared by the action of the ground fault relays and, after a predetermined time, if the ground fault relays fail to clear the fault. A third object of my invention is to provide an improved protective arrangement whereby for any one ground fault, not cleared by the ground fault neutralizing means, only one circuit closing and opening of the switching means used to establish the desired grounding can occur. These and other objects of my invention will hereinafter appear in more detail.

My invention will be better understood from the following description when considered in connection with the accompanying drawing, and its scope will be pointed out in the appended claims.

Figure 2:
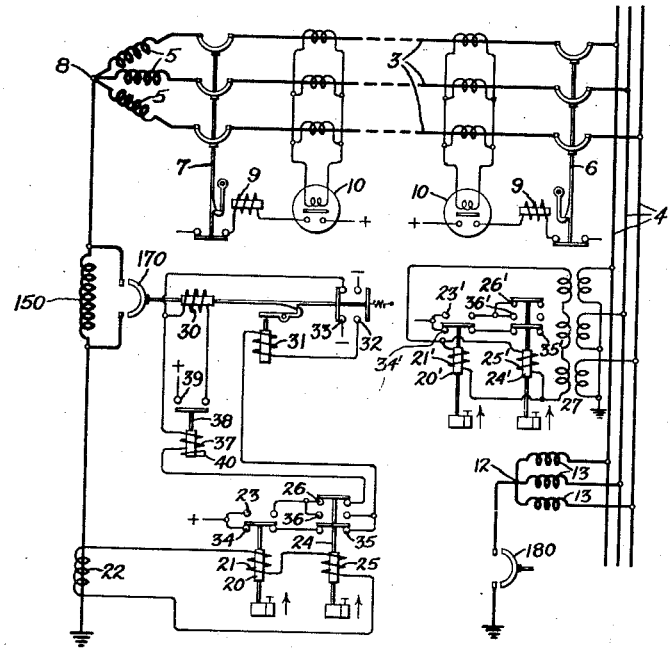

In the accompanying drawing Fig. 1 illustrates diagrammatically an embodiment of my invention as applied to the protection of a three-phase alternating current electric power system, and Fig. 2 illustrates diagrammatically a modification of the embodiment of my invention shown in Fig. 1.

The embodiment of my invention shown in Fig. 1 is illustrated as applied to the protection of a three-phase alternating current electric power system which includes a power line 3 interconnecting a station, indicated by busses 4, and Y-connected windings 5 through suitable circuit interrupting means, such as latched closed circuit breakers 6 and 7. The windings 5, which provide a neutral point 8, may be those of a power transformer, or otherwise, at some suitable point of the system. The power line 3 is shown partly in broken lines merely to give a concept of distance. It will, of course, be understood that the power system may include other stations associated with power lines extending from the portion of the system illustrated, but I have shown only as much of the system as is necessary to an understanding of my invention.

For controlling the opening of the circuit breakers 6 and 7 through their trip coils 9, suitable relaying means responsive to ground faults are provided. As illustrated, these relaying means comprise simple overcurrent relays 10. These may be of the induction disk time limit type, examples of which are well known to the art. For more selective action, the ground fault responsive relays may be of the two-coil directional type, examples of which are also well known to the art. For response to ground faults, the relays 10 may be connected to be energized in accordance with the sum of the currents in the line conductors at the relay location. One way in which this may be done is to connect the windings of the relays across parallel-connected current transformers 11.

The neutral point 8 of the windings 5 may be used for grounding purposes. Other neutral points suitably derived may be similarly used. Thus at station 4 the neutral point 12 may be established by the Y-connected windings 13. The neutral points 8 and 12 are, in accordance with my invention, arranged to be connected to ground to establish that grounding of the system on which the prearranged settings of the system ground fault relays 10 are based so as to insure the desired selectivity of relaying operation.

Inasmuch, however, as it is desirable to clear as many ground faults as possible without circuit breaker operation, at least one of the neutral points 8 is grounded through suitable arc suppressing apparatus, such as a ground fault neutralizer 14, after the manner and for the purpose disclosed in the previously mentioned United States Letters Patent 1,537,371. Depending on the extent of the system and also whether or not it may at times be operated as a divided system, ground fault neutralizers may be provided at other points of the system. The ground fault neutralizer 14 is an inductance device whose zero phase sequence inductance is such as to provide, on the occurrence of a ground on a phase conductor of the system, a lagging current for effectively suppressing the capacitance current to ground at the fault. Where more than one neutralizer is provided on the system, the suppressing effect of each neutralizer will be sufficient to take care of a predetermined portion of the system, such portion being determined by the probable division of the system under different operating conditions. Then, when the whole system is in service, all of the neutralizers share in providing sufficient lagging current to neutralize the capacitance current to ground in case of a ground fault.

For the purpose of illustrating my invention, it will be assumed that, upon the occurrence of a ground fault anywhere on the system shown, enough lagging current is caused to flow in the neutralizer 14 to neutralize the capacitance current to ground of the ungrounded phase conductors of the system so that the fault, if of a transient character, is cleared. The particular type of ground fault neutralizer to be used is immaterial so far as my invention is concerned.

However, in Fig. 1 I have illustrated it as having a core 14' and as comprising two mutually inductively related windings 15 and 16. The winding 15 is connected directly between the neutral point 8 and ground. The function of the winding 16 is to reduce the inductance of the connection between the neutral point 8 and ground for reasons which will hereinafter appear.

When the fault is not of a transient character, however, resort may be had to circuit breaker operation so as to isolate the faulty portion of the system without disturbing continuity of service on sound portions. It is then necessary to rely upon the ground fault relays 10, but their action, as heretofore pointed out, can only be selective for that predetermined grounding of the system for which prearranged relay settings are made. Accordingly, I provide means for effecting this grounding a predetermined time after the appearance of a fault, in other words, after a time sufficient for the ground fault neutralizers to suppress the fault if of a transient character. Thus at the point where the ground fault neutralizer 14 is located, I provide means for reducing the zero phase sequence inductance of the ground fault neutralizer and at station 4 to establish a connection to ground from the neutral point 12. The reduction of the inductance of the neutralizer 14 may be accomplished by short-circuiting a portion, or all, of the winding 16 depending upon the amount of impedance it is desired to have between the connection of the neutral point 8 and ground to provide the desired response of the ground fault relays 10. Other grounding connections may include impedance devices, as desired, for selective ground fault relaying. The connections to ground and the reduction of the inductance of the ground fault neutralizer 14 may be established in any suitable manner, but I propose to accomplish them by closing normally open switching means 17 and 18 a predetermined time after the occurrence of a ground fault. As shown, the switching means 17 is arranged to close its contacts 17' to short-circuit the winding 16 and thereby reduce the inductance of the neutralizer 14. The switch 18, however, is merely arranged through its contacts 18' to complete a connection to ground from the neutral point 12.

For this purpose the switching means 17, which is illustrated simply as of the contactor type having a closing and holding winding 19, may have its closing operation initiated in response to the flow of the current appearing in the neutralizer winding 15 on the occurrence of a ground fault on a phase conductor of the system. The closing may be effected by any suitable ground fault responsive means, such as an overcurrent relay 20, whose energizing winding 21 is connected through suitable means, such as a current transformer 22, for energization in dependence on the current flowing in the neutralizer winding 15 to ground. For effecting the closing operation a desired time interval after the appearance of the ground fault sufficient for the neutralizer 14 to accomplish its fault suppressing action, the ground fault detector relay 20 is of a definite time delay type and as shown has circuit closing contacts 23 which close a predetermined time after the appearance of current in the ground connection from the neutral point 8 through the neutralizer winding 15. The closing of the contacts 23 completes the circuit of the winding 19 whereby to effect the closing of the switch 17.

Obviously, upon cessation of current flow in the grounding connection from the neutral point 8 through the neutralizer 14, the ground fault responsive relay 21 will drop out and thereby deenergize the winding 19 of the switching means 17 to effect the opening of this switching means. This restores the system to ground fault neutralizer operation.

However, since it is frequently desirable to return the system to ground fault neutralizer operation in the event of failure of the ground fault responsive relays to effect the clearing of a ground fault, I provide means for returning to ground fault neutralizer operation after a predetermined interval sufficient for the ground fault relays to function. As shown, this means comprises a second ground fault responsive relay 24 whose energizing winding 25 may be connected to be energized from the current transformer 22. As shown this relay is provided with circuit opening contacts 26 in series with the contacts 23 of the relay 21 in the circuit of the winding 19 of the switching means 17. The fault detector relay 24 is of the definite time delay circuit opening type and is set to respond to a predetermined value of current flowing in the neutralizer connection with a longer time delay than the relay 21. The relay 24 could be set to respond to the higher current following the closing of the switch 17 which reduces the inductance of the neutralizer 14. In this case, its time delay would not have to include the time delay of the relay 21.

The closing and opening of the grounding switch 18 may be controlled in substantially the same manner as the switch 17 except for the fault responsive relays which initiate the operation. Thus at station 4 the closing operation may be initiated by a ground fault responsive relay 20', which has time delayed circuit closing contacts 23', for effecting the closing of the grounding switch 18. The opening operation may be initiated by a ground fault responsive relay 24', which has time delayed circuit opening contacts 26' in the circuit of the closing and holding winding of the switching means 18. The circuit closing action of the relay 20' is delayed for a time long enough to give the ground fault neutralizing means a chance to suppress a ground fault, and the circuit opening action of the relay 24' is delayed long enough thereafter to give the ground fault relays a chance to clear the ground fault. For ground fault response, the relays 20' and 24' may have their energizing windings 21' and 25' connected in parallel to close the delta of a Y-delta connected potential transformer 27 which is energized from the busses 4. Thus the switch closing and opening equipment at grounding points without neutralizers is essentially the same as that for the grounding switch 17 associated with the neutralizer 14.

Assuming the parts positioned as shown in the drawing and also that a fault occurs to ground on one of the phase conductors of the line 3, as indicated at X, then the voltages to ground at the neutral points 8 and 12 are substantially the Y-voltage of the system. Accordingly, lagging current flows in consequence of the neutralizer 14 to the grounded point X in an amount substantially equal but opposite in phase to the capacitance current to ground of the ungrounded phase conductors of the system. The flow of current in the neutral connection through the ground fault neutralizer winding 15 energizes the overcurrent relays 21 and 24. If the ground fault neutralizer 14 functions to suppress the ground fault current before the timing relay 20 closes its contacts 23, this relay drops back, and nothing more happens. If, however, the ground fault is not of a transient character such that the ground fault neutralizer 14 can suppress the fault, the timing operation of the relay 20 is continued until the closing of its contacts 23 completes the circuit of the winding 19 of the switching means 17 to effect the closing thereof. Similarly at station 4 and elsewhere in the system the grounding switches, such as 18, are closed in response to the operation of the ground fault relays 21' after the manner set forth in connection with the switch 17.

Upon closure of the switching means 17, the neutralizer winding 16 is short-circuited through the switch contacts 17'. This decreases the inductance of the neutralizer 14, and there is, consequently, an increased flow of current in the connection to ground from the neutral point 8 through the neutralizer winding 15. Since the neutral points are now grounded to correspond with the prearranged settings of the ground fault relays 10, these have their opportunity to clear the fault by responding, for example, to trip their respective circuit breakers 6 and 7. If these relays do clear the fault, the cessation of flow of ground fault current in the neutral connections causes the deenergization of the relays 20, 20' which drop out to open the contacts 23, 23' and thereby deenergize the windings of the grounding switch means 17 and 18. These consequently open so that everything is restored to the normal condition.

In the event, however, that the ground fault relays fail to effect a clearing of the ground fault, the current to which the relay 24 responds continues long enough to cause this relay to open its contacts 26. This deenergizes the circuit of the winding 19 and results in the opening of the switching means 17. Similarly at station 4 the relay 24' has had time enough to open its contacts 26' and thus drop out the grounding switch 18 at this station. The system is thus restored to neutralizer action which limits the flow of ground fault current to reasonably safe values until the fault is cleared through suitable manipulation of the system circuit breakers by the operating personnel. In this case, the relays 21, 24, 21', 24', etc., return to the normal positions shown in the drawing.

In the embodiment of my invention shown in Fig. 2 I have illustrated the ground fault neutralizer as a single inductive winding 150 which is arranged to be short-circuited, either wholly or in part, by a grounding switch 170. This is illustrated as a latched closed circuit breaker having a closing winding 30, a tripping coil 31, *a* auxiliary switch contacts 32 and *b* auxiliary switch contacts 33. In order to control a latched closed switch of this type in accordance with my invention, the ground fault detector relay 21 is provided with another set of contacts 34 which are time delayed circuit opening. Also the ground fault detector relay 24 is provided with additional time delayed circuit opening contacts 35 and circuit closing contacts 36. As shown, the contacts 23 and 26 are arranged in series in the circuit of the energizing winding 37 of a closing control relay 38 and the *b* auxiliary switch contacts 33. As illustrated the closing control relay 38 is of the time delayed drop-out type with contacts 39 circuit opening to insure the latching of the switch. For this purpose, it may have a shading winding 40 to delay its drop-out, as is well known to the art.

In order to insure the tripping of the switch 170 following the clearing of a fault by the ground fault relays 10, the contacts 34 and 35 of the relays 20 and 24, respectively, are connected in series with the circuit of the trip coil 31 through the *a* auxiliary switch contacts 32. In order to insure the tripping of the circuit breaker in the event that neither the ground fault neutralizer 150 nor the overcurrent relays 10 effect the clearing of a ground fault, the contacts 23 of the relay 20 and the contacts 36 of the relay 24 are arranged in series in the circuit of the tripping coil 31 and the *a* auxiliary switch contacts 32. At other grounding points, such as station 4, for example, a latched closed circuit breaker 180 may also be used and likewise relays 20' and 24' which are connected in the manner shown and described in connection with Fig. 1. The relay 20' is provided with circuit opening contacts 34' and circuit closing contacts 23'. The relay 24' is provided with circuit opening contacts 35' and 26' and circuit closing contacts 36'. The contacts of these relays are connected after the manner shown in connection with the control of the switch 170.

Since the operation of this embodiment of my invention is essentially the same as the embodiment shown in Fig. 1, a few brief remarks will suffice to make the operation clear. Under normal conditions, the parts are positioned as shown in Fig. 2. On the occurrence of a ground fault on the system, the relay 20 operates after a predetermined interval of neutralizer current to close its contacts 23 whereby to complete the circuit of the closing control relay 38 through the contacts 26 of the relay 24 and the *b* auxiliary switch contacts 33. The closing control relay 38, being thus energized, completes the circuit of the closing coil 30 through its contacts 39 and the *b* auxiliary switch contacts 33. This operation occurs, of course, only in the event that a ground fault is of a character which the ground fault neutralizer cannot suppress. The grounding of the neutrals at other stations, such as 4, is effected in substantially the same manner. When all the neutrals are grounded in accordance with the prearranged settings of the ground fault relays 10, they have an opportunity to clear the fault. If they so operate, then the relay 20 drops out to close its contacts 34 before the relay 24 can open its contacts 35. The circuit of the trip coil 31 is thus completed to effect the opening of the grounding switch 170. Similar action occurs at other grounding points.

When the neutrals are grounded to accord with the prearranged time settings of the ground fault relays 10 by the closing of all the grounding switches, increased current flow results in those neutrals where ground fault neutralizers are employed. Thus, after a predetermined time of such short circuit current flow at such neutrals, the ground fault relay 24 operates and at the expiration of this predetermined time the relays 24' at the normally ungrounded neutrals operate. It is assumed that the ground fault relays 10 have not operated by the time this interval has elapsed. Accordingly, since the contacts 23 of the relay 20 are closed, the closing of the contacts 36 of the relay 24 completes the circuit of the trip coil 31 to effect the opening of the switch 170 so as to return to ground fault neutralizer operation at the neutral point 8. Similar action occurs at the other grounding points to open the grounding switches and thus restore the whole system to ground fault neutralizer operation.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an alternating current electric system of the type in which a fault to ground on one phase conductor of the system substantially increases the capacitance current to ground of the ungrounded phase conductors of the system, arc suppressing means connected to said system and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially increasing the flow of ground fault current, and means for reducing the flow of ground fault current substantially to its initial value if said increased flow of ground fault current lasts a predetermined time after the operation of said current flow increasing means and immediately upon cessation of flow of said ground fault current prior to the expiration of said last mentioned predetermined time.

2. In an alternating current electric system of the type in which a fault to ground on one phase conductor of the system substantially increases the capacitance current to ground of the ungrounded phase conductors of the system, arc suppressing means connected to said system and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially increasing the flow of ground fault current, means for reducing the flow of ground fault current substantially to its initial value if said increased flow of ground fault current lasts a predetermined time after the operation of said current flow increasing means, and means for preventing a subsequent increased flow of ground fault current if the ground fault current continues after the expiration of said last mentioned predetermined time.

3. In an alternating current electric system of the type in which a fault to ground on one phase conductor of the system substantially increases the capacitance current to ground of the ungrounded phase conductors of the system, means tending to interrupt said system on the occurrence of a ground fault on the system, arc suppressing means connected to said system and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially reducing the zero phase sequence inductance of said arc suppressing means whereby to increase the flow of ground fault current, and means operative independently of the opening of said interrupting means after the flow of said increased ground fault current for a predetermined time to restore the zero phase sequence inductance of said arc suppressing means to its initial value.

4. In an alternating current electric system having a neutral point and of the type in which a fault to ground on one phase conductor of the system substantially increases the capacitance current to ground of the ungrounded phase conductors of the system, a connection to ground from said neutral point having a zero phase sequence inductance operative on the occurrence of a ground on a phase conductor of the system to provide a lagging current for effectively suppressing the capacitance current to ground at the grounded point, means operative in response to the flow of said lagging current for a predetermined time to reduce substantially the zero phase sequence inductance of said connection whereby to increase the flow of ground fault current, and means for restoring the inductance of said connection to its initial value a predetermined time after the operation of said lagging current responsive means and immediately upon cessation of flow of said ground fault current prior to the expiration of said last mentioned predetermined time.

5. In an alternating current electric system having a neutral point and of the type in which a fault to ground on one phase conductor of the system substantially increases the capacitance current to ground of the ungrounded phase conductors of the system, arc suppressing means connected between said neutral point and ground and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially reducing the zero phase sequence inductance of said arc suppressing means whereby to increase the flow of ground fault current, and means for restoring the zero phase sequence inductance of said arc suppressing means to its initial value a predetermined time after the operation of said zero phase sequence inductance reducing means and immediately upon cessation of flow of said ground fault current prior to the expiration of said last mentioned predetermined time.

6. In an alternating current electric system having a neutral point and of the type in which a fault to ground on one phase conductor of the system substantially increases the capacitance current to ground of the ungrounded phase conductors of the system, a connection to ground from said neutral point having a zero phase sequence inductance operative on the occurrence of a ground on a phase conductor of the system to provide a lagging current for effectively suppressing the capacitance current to ground at the grounded point, means operative in response to the flow of said lagging current for a predetermined time to reduce substantially the zero phase sequence inductance of said connection whereby to increase the flow of ground fault current, and means for changing the impedance of said connection when said increased flow of ground current continues for a predetermined time after the operation of said lagging current responsive means.

7. In an alternating current electric system having a plurality of neutral points and of the type in which a fault to ground on one phase conductor of the system substantially increases the capacitance current to ground of the ungrounded phase conductors of the system, protective means for clearing system ground faults including relays set to respond to a fault between a phase conductor of the system and ground on the basis of a predetermined grounding of said neutral points, a connection to ground from at least one of said neutral points having a zero phase sequence inductance operative on the occurrence of a ground on a phase conductor of the system to provide a lagging current for effectively suppressing the capacitance current to ground at the grounded point and the neutral points without such zero phase sequence inductance connection being ungrounded, means operative in dependence on the current in said neutral to ground connection for establishing a predetermined time after the occurrence of the ground fault another connection to ground from said one neutral point, and means operative on the occurrence of the ground for effecting in said predetermined time thereafter the other ground connections of the ungrounded neutrals necessary to establish said predetermined grounding of the neutral points for which said relays are set to respond whereby to give the relays an opportunity to clear the ground fault if it has not been suppressed by said zero phase sequence inductance connection, and means for disestablishing said other ground connection and the ground connections of the ungrounded neutrals upon the clearance of the fault in response to the operation of said relay.

8. In an alternating current electric system having a plurality of neutral points and of the type in which a fault to ground on one phase conductor of the system substantially increases the capacitance current to ground of the ungrounded phase conductors of the system, protective means for clearing system ground faults including relays set to respond to a fault between a phase conductor of the system and ground on the basis of a predetermined grounding of said neutral points, a connection to ground from at least one of said neutral points having a zero phase sequence inductance operative on the occurrence of a ground on a phase conductor of the system to provide a lagging current for effectively suppressing the capacitance current to ground at the grounded point and the neutral points without such zero phase sequence inductance connection being ungrounded, means operative in dependence on the current in said neutral to ground connection for establishing a predetermined time after the occurrence of the ground fault another connection to ground from said one neutral point, and means operative on the occurrence of the ground for effecting in said predetermined time thereafter the other ground connections of the ungrounded neutrals necessary to establish said predetermined grounding of the neutral points for which said relays are set to respond whereby to give the relays an opportunity to clear the ground fault if it has not been suppressed by said zero phase sequence inductance connection, and means for disestablishing said other ground connection and the connections to ground of the ungrounded neutrals substantially immediately upon the clearance of the ground fault in response to the operation of said relays within a predetermined time after the occurrence of the ground fault.

FRANCIS A. HAMILTON, Jr.